United States Patent [19]

Lower

[11] Patent Number: 4,855,892

[45] Date of Patent: Aug. 8, 1989

[54] POWER SUPPLY FOR PLASMA DISPLAY

[75] Inventor: Edwin M. Lower, Richmond, Tex.

[73] Assignee: Compaq Computer Corporation, Houston, Tex.

[21] Appl. No.: 302,070

[22] Filed: Jan. 24, 1989

Related U.S. Application Data

[63] Continuation of Ser. No. 13,689, Feb. 12, 1987.

[51] Int. Cl.[4] .............................................. H02M 7/515

[52] U.S. Cl. .......................................... 363/86; 363/53; 361/18

[58] Field of Search ............... 323/265, 266, 276, 277; 361/18; 363/52, 53, 86

[56] References Cited

U.S. PATENT DOCUMENTS 3,527,997 9/1970 Nercessian ............................ 361/18

3,582,713 6/1971 Till ........................................ 361/18

3,913,036 10/1975 Hook .............................. 331/113 A 4,013,938 3/1977 McCoy ................................ 323/278

4,347,509 8/1982 Hardway et al. .................... 340/778

4,356,541 10/1982 Ikenoue et al. ........................ 363/53

4,428,016 1/1984 Brasfield ................................ 361/18

4,675,798 6/1987 Jost et al. .............................. 363/54

*Primary Examiner*—Patrick R. Salce

*Assistant Examiner*—Jeffrey Sterrett

*Attorney, Agent, or Firm*—J. David Cabello

[57] ABSTRACT

A regulated plasma display power supply includes sequencing circuitry for triggering the high voltage power supply output only after other computer operational voltages are properly functioning. The power supply output is disabled if any of those operational voltages fail. A power supply short circuit protection scheme is included to prevent high power dissipation in the power transistor and possible damage to the regulator. Over-shoot protection is provided at the power supply input to protect the power supply components from over voltage spikes.

4 Claims, 3 Drawing Sheets

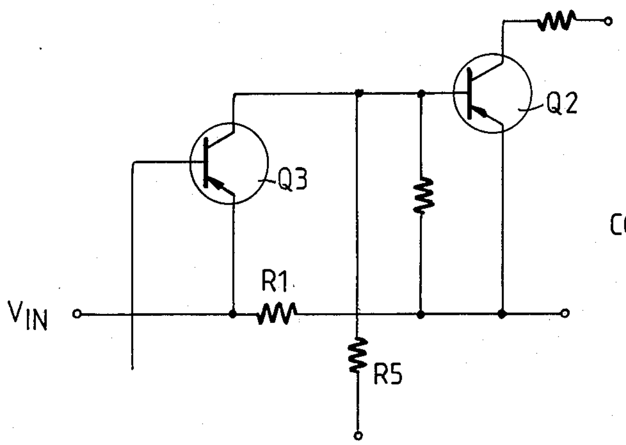
Fig. 4
Fig. 5
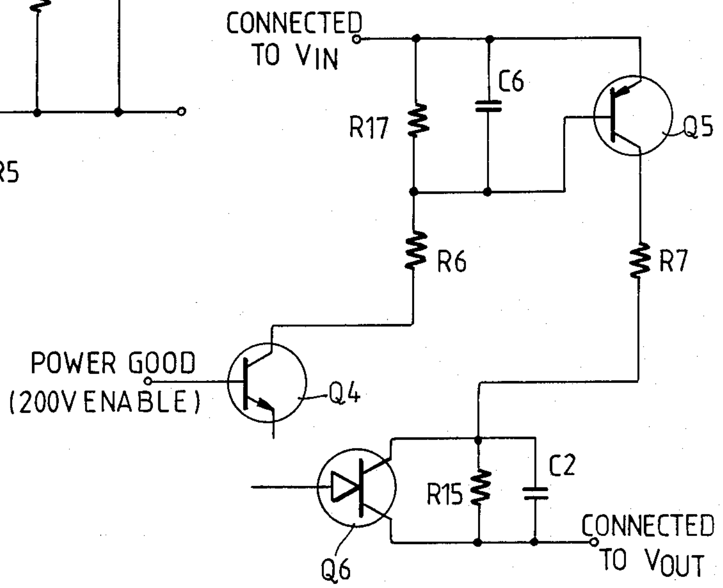
Fig. 3
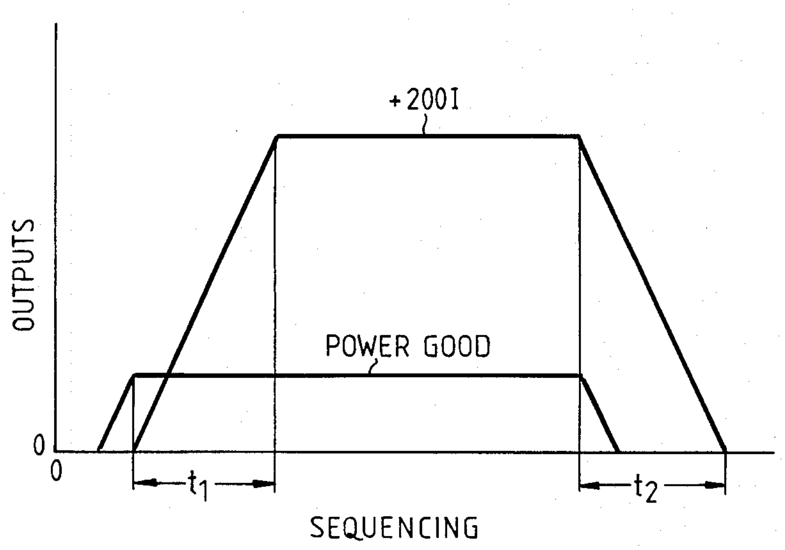

POWER SUPPLY FOR PLASMA DISPLAY

This is a continuation of co-pending application Ser. No. 013,689, filed on Feb. 12, 1987.

FIELD OF THE INVENTION

This invention relates to regulated power supplies used in computers and, more particularly, to a high voltage D.C. power supply for use with a plasma display in a personal computer.

BACKGROUND OF THE INVENTION

The plasma display technology is relatively new and has generated a whole new set of requirements for regulated power supplies. A plasma display will typically require a power supply which generates highly regulated 200 volt D.C. and 5 volt D.C. outputs. The supply voltages are generally isolated from other voltages within the computer and the power supply must generally be current limited and short circuit protected. An additional requirement of the power supply used with a plasma display is that the 200 volt D.C. output must be enabled only after other computer operational voltages have stabilized. If other operational voltages fail for any reason, the 200 volt D.C. voltage for the plasma display must be disabled. This sequencing of the 200 volt D.C. output is required to prevent damage to the plasma display.

An adjustable three terminal regulator, due to its not having a ground end, can regulate high voltages as long as its differential voltage rating is not exceeded. In *Linear Technology Data Book*, 1986, at pages 71–72, a circuit is described which will protect the regulator from a short circuit condition but, as stated in the reference, such a scheme for high voltage regulation is limited by the power dissipation capabilities of the device in series with the regulator.

With an input voltage of 250 volts and a typical current of 200 milliamps, the power dissipated is approximately 50 watts. Should a short circuit condition exist for an extended period, which may occasionally occur, an excessive amount of heat is generated requiring an unacceptably large power transistor and heat sink.

An attempt to reduce the power dissipation by causing the current limit circuitry to oscillate causes the load change to be reflected to other outputs, causing high ripple content at a frequency approximating the current limit oscillations.

Further, providing an input voltage to the regulator that will not exceed the safe operating levels of the regulator becomes a concern due to the voltage overshoot caused by transformer leakage inductance. Left unimpeded, this inductance can allow the input voltage to vary by as much as 30%.

The plasma display technology further requires a sequencing or timing control of the 200 volt D.C. output to the display to prevent possible damage o the display. The display voltages must be enabled only after all other computer operational voltages have been established and have stabilized at their normal level. In the event one of those operational voltages fail, the display voltages must be disabled. This sequencing or timing requirement requires coordination of the display voltages with other operational voltages within the computer.

SUMMARY OF THE INVENTION

A power supply according to the present invention will be characterized by a sequencing or timing control to enable and disable the power supply output. The sequencing control will coordinate the activation and deactivation of the display voltage with the other operational voltages within the computer. A short circuit protection scheme is also provided to monitor the electrical potential difference between the power supply input and output. When a pre-selected potential difference between the power supply input and output is exceeded, the power transistor is turned off and the power supply output is disabled. Overshoot protection is included at the input of the power supply so that the power supply components are not subjected to overvoltage stresses.

It is an object of the present invention to provide a power supply for a computer with a plasma display panel which is capable of withstanding high differential voltages which can occur during short circuit conditions. It is a further object of the invention to protect the voltage regulating devices from excessive heat dissipation during over-current or short circuit conditions.

It is a further object of this invention to sequence the gas plasma display voltages and enable such voltages only after all other computer operating voltages have reached a pre-selected, i.e. normal, voltage level. It is a further object of this invention to disable the gas plasma display voltage in the event that any of the other computer operating voltages fail or drop below a preselected level.

BRIEF DESCRIPTION OF THE DRAWINGS

FIG. 3 is a art which illustrates the sequencing of the voltage levels of the power supply.

FIG. 4 is a partial schematic diagram of the power supply illustrating transistors Q2 and Q3 and their associated elements.

FIG. 5 is a partial schematic diagram illustrating transistors Q4, Q5 and SCR Q6 and their associated elements.

DETAILED DESCRIPTION OF A PREFERRED EMBODIMENT

Figure 1:
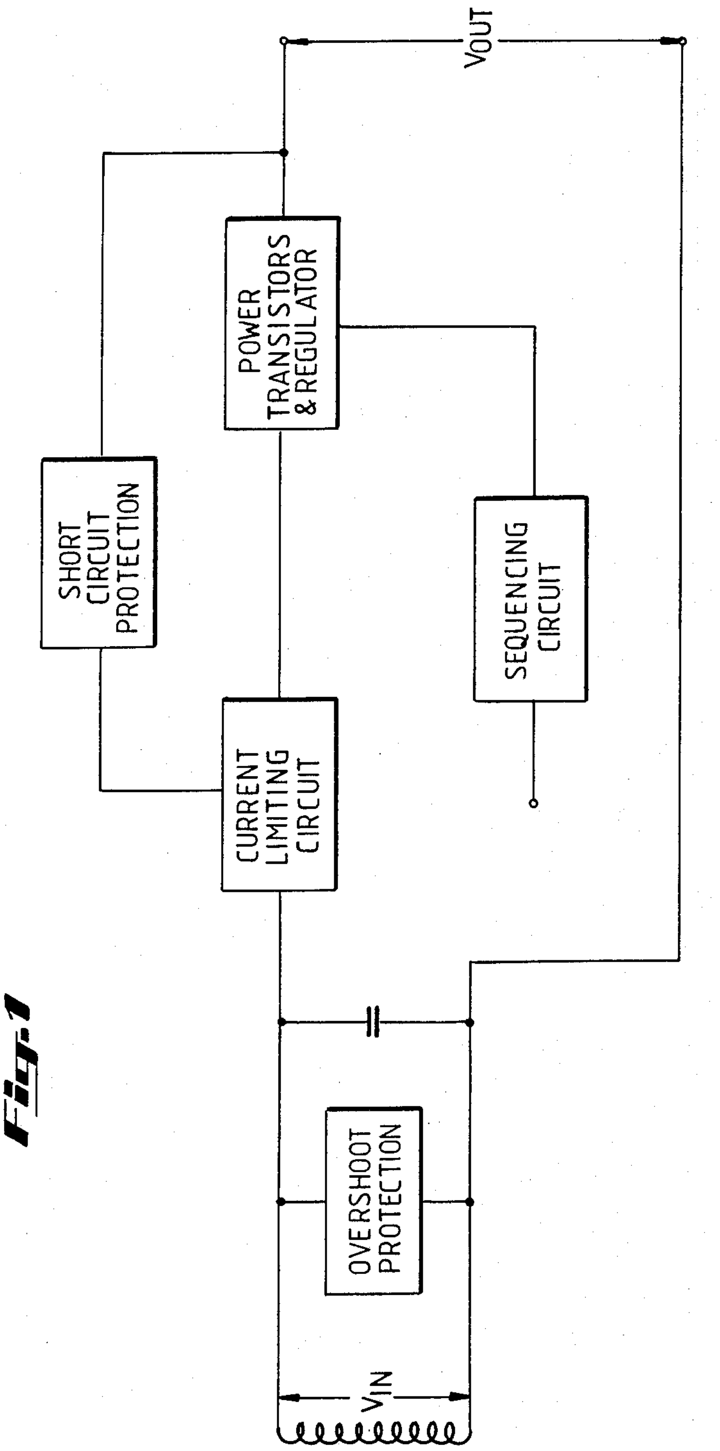
FIG. 1 is a simplified block diagram showing the major components of a power supply according to the present invention.

Referring to FIG. 1, the primary components of a regulated power supply according to the present invention include a power transformer, an overshoot protection circuit connected across the secondary winding of the transformer, a current limiting circuit for limiting the electrical current flowing through the power supply, a power transistor and regulator circuit for regulating the power supply output voltage level, a short circuit protection scheme electrically connected between the power supply input and power supply output, and a sequencing circuit for receiving a control signal and controlling the conduction of the power transistor. The transformer used in the present invention may be a separate transformer used with other computer power supplies or it may be a separate secondary winding on a single transformer core. For a typical plasma display power supply, V-in will be approximately 225–250 volts and V-out will be approximately 200 volts D.C.

Figure 2:
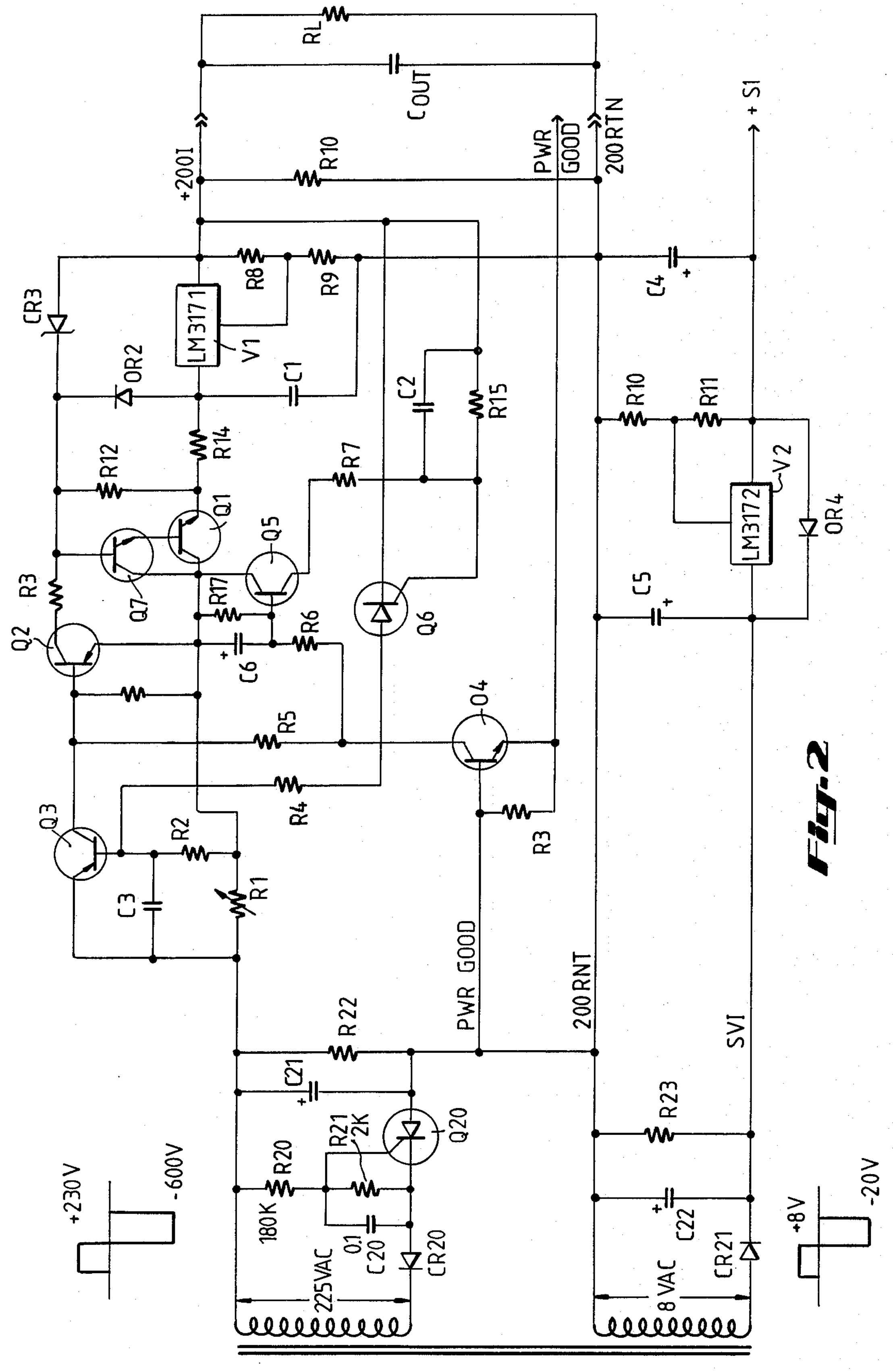
FIG. 2 is a schematic diagram of one embodiment of the present invention.

Referring now to FIG. 2, a plasma display power supply will typically comprise a collection of capacitors, resistors, transistors and other semiconductor devices. The values for the passive and active elements shown in FIG. 2 are provided in Appendix A. Appendix A is attached hereto and incorporated by reference as if set forth herein. In addition, a commonly utilized three terminal regulator will be employed to regulate the output voltage of the power supply.

The power supply shown in FIG. 2 includes two transformer output windings, one used for the 200-volt power supply output and the other used for the 5-volt power supply output. The 5-volt power supply output utilizes a known three terminal regulator, type LM317, and the generation and regulation of the 5-volt power supply output is according to known principles.

An overshoot protection circuit is connected across the transformer winding used for the 200-volt power supply voltage. This protection circuit is necessary to prevent voltage level which will have deleterious effects on the plasma display. The protection is provided by using SCR Q20 in the manner to be described.

The overshoot protection circuit prevents a high-voltage condition from occurring at the plasma panel during transient conditions on the primary side of the fly-back transformer or during the period that the fly-conditions back transformer is in the forward mode. The over-voltage conditions must be controlled to prevent voltage levels which may have a deleterious effect on the plasma panel. The over-voltage (overshoot) protection is implemented in the manner illustrated in FIG. 2. The timing constant of the RC network is long enough for the SCR to remain off until the overshoot subsides.

The overshoot protection is implemented with SCR Q20 and the RC network adjacent to Q20 (See FIG. 2). The overshoot protection circuit includes resistors R20 and R21, capacitor C20, and silicon controlled rectifier (SCR) Q20. Empirically, it has been determined that the over-voltage resulting from the overshoot phenomenon lasts for approximately four microseconds. The RC network of R21 and C20 has a time constant of approximately five microseconds when R21 is 2K ohms and C20 is 0.01 microfarads. This timing circuit delays the triggering of SCR Q20 long enough for the over voltage condition to dissipate or subside. Therefore the timing constant of the RC network is long enough for the SCR to remain off until the overshoot (over voltage) condition subsides.

Capacitor C21 is connected across the transformer winding to provide a substantially constant input voltage to the power supply. CR20 provides reverse bias protection to Q20 preventing a negative 600 volts from being applied to Q20 at the time the primary of the fly-back transformer is in the forward mode.

The current limiting circuit of the power supply in FIG. 2 generally comprises resistors R1 and R2, capacitor C3 and transistor Q3. Resistor R1 is variable and may be adjusted to control the power supply through-current at the desired level. The interaction of the current-limiting circuit and the enabling and protection circuits will be discussed below.

Transistor Q1 is the main power transistor used to conduct the power supply current. Its conduction is controlled by transistors Q2 and Q4 in a manner which will be more fully explained below. Regulator U1 is a type LM317-1 which is an adjustable three terminal regulator well known in the art. Regulator U1 employs resistors R8 and R9. The ratios of the values of these resistors in combination with the regulator controls the power supply output voltage at 200 volts. Typically, the regulator is capable of withstanding a voltage difference between its input and output terminals of approximately 40 volts. Transient protection diode CR3 is used to limit the potential difference across regulator LM317-1 during normal and abnormal conditions.

Silicon controlled rectifier SCR Q6 and its associated circuitry provides overload protection for power transistor Q1 and regulator U1. In providing this protection, the overload circuit detects the potential difference between the power supply input and output. When that potential difference exceeds a pre-selected magnitude (i.e. in the present embodiment, 100 volts), SCR Q6 begins to conduct, causing power transistor Q1 to stop conducting, thus disabling the 200-volt power supply output. Such a condition will generally arise when the power supply output is short circuited as in a fault condition.

Transistor Q5, SCR Q6, resistors R6, R7, R15 and R17, and capacitors C2 and C6 make up the circuit that provides the control for protecting the power transistor Q1 and regulator U1. transistor Q1 has a safe operating area defined by the manufacturer of the transistor which is associated with its design and process. This safe operating area is a function of voltage, current and time—that is, the maximum power dissipation of the transistor under pulse conditions or steady state DC conditions.

The R7/R15 voltage divider sets the voltage level at which transistor Q1 will be caused to stop conducting. When the power supply is powered up, the power supply input voltage will go to its normal operating level of approximately 225–250 volts. When other operational voltages within the computer are normal, a "power good" signal will be received at the base of transistor Q4 as will be more fully explained below. Transistor Q4 will begin to conduct in response to that power good signal, causing transistor Q2 to begin to conduct and, thus, power transistor Q1. The triggering mechanism of transistors Q2 and Q4 will be more fully explained below. When the power transistor Q1 begins to conduct, a voltage will begin to appear at the output of the power supply, however there will be a normal delay in the rise time of this voltage to its normal level of 200 volts. SCR Q6 and its associated circuitry are designed to delay operation during the normal rise time of the output voltage.

Transistor Q5 and its associated components, capacitor C6 and resistors R6 and R17, control the period of time that SCR Q6 is disabled after the power good signal is received. When transistor Q4 first begins to conduct in response to the power good signal, the voltage across capacitor C6 is equal to 0 volts and transistor Q5 is not conducting. Resistor R6 and capacitor C6 provide a time constant which is set for the slowest anticipated rise time of the voltage output supply of 200 volts. The voltage across capacitor C6 rises until transistor Q5 is forward biased and begins to conduct. Transistor Q5 then operates in the saturated mode, enabling the SCR Q6 circuit. The R7/R15 voltage divider network then divides the voltage difference which appears across power transistor Q1 and regulator U1. When that potential exceeds a preselected value, for example, 100 volts, SCR Q6 is triggered and provides an electrical path from the power supply input to the power supply output via resistors R1, R2 and R4 and SCR Q6. Capacitor C2 is present to prevent transients or noise from triggering SCR Q6. Resistor R17 is selected to provide a discharge path for capacitor C6 and to set a maximum bias of the base/emitter of transistor Q5 and provide a path for base/collector leakage current of transistor Q5.

Transistors Q2 and Q4 cooperate to act as a triggering mechanism for power transistor Q1. An electrical signal is generated by the computer when the operational voltages within the computer are at their normal levels. The terminology "power good" refers to a voltage level which has reached its operating level and stabilized.

In the preferred embodiment, over-voltage protection is also provided. The voltage levels for the preferred embodiment re set forth below. The voltage levels are not be viewed as limitations of the invention but rather as illustrative of the preferred embodiment.

| Output | "Good" Defined Level | "Upper Limit" |
|---|---|---|
| +5.1 volts | 4.7 volts | 7.0 volts |
| +12.3 volts | 10.0 volts | 14.5 volts |
| −12.0 volts | −10.0 volts | −14.5 volts |

The "power good" signal is transmitted to the base of transistor Q4, causing it to switch on. This triggering of transistor Q4 causes transistor Q2 to begin to conduct, providing base current to transistor Q7 and, in a Darlington fashion, to transistor Q1. In this manner, the "power good" signal from the computer, indicating that all other operational voltages are at their normal levels, will trigger the switching on of power transistor Q1, causing the 200-volt power supply output to be generated.

Transistor Q2 base current is provided by transistor Q4 being on in response to the power good signal received. Transistor Q4 provides a source of current through resistor R5 to the power supply input voltage $V_{in}$. This current source turns transistor Q2 on, thus turning on power transistor Q1. During current limiting (transistor Q3 turning on), the current through resistor R5 is diverted from transistor Q2 to transistor Q3, thus putting transistor Q2 in the linear mode controlling the base current of power transistor Q1. When transistor Q3 is in the "on" or "saturated" mode, the voltage from the collector to the emitter of transistor Q3 is approximately 0.2–0.3 volts, which is below the level of the voltage from the base to the emitter of transistor Q2. Accordingly, transistor Q2 will be off and all current through resistor R5 will be seen by transistor Q3. In effect, SCR Q6 connects the input of the power supply to the output through resistor R4 when transistor Q3 is forward biased, thus turning transistor Q2 off.

During operation of the power supply, if one of the operational voltages within the computer fails, the "power good" signal will go false, that is, dissipate or fall off. When that happens, transistor Q4 will cease to conduct and transistor Q2 will accordingly cease conducting. This causes power transistor Q1 to cease conducting, thus opening the electrical path between the power supply input and output. The 200-volt power supply output is thus disabled, preventing possible damage to the plasma display.

Referring now to FIG. 4, a partial schematic of the power supply schematic illustrated in FIG. 2 is provided. The partial schematic is provided to aid in the understanding of the operation of transistors Q2, and Q3. Transistors Q2 and Q3 shown in FIG. 4 operate in the same fashion as transistors Q2 and Q3 shown in FIG. 2.

The base current of transistor Q2 is provided by transistor Q4 when Q4 is conducting. When Q4 is conducting it will source current through R5 (base to emitter of Q5) to $V_{in}$ which causes Q2 to turn on which subsequently causes Q1 to turn on. During the current limit conditions (i.e. Q3 is on) the current through R5 is diverted from Q2 to Q3. Diverting the current from Q2 to Q3 places Q2 in the linear mode thereby controlling the base current of Q1. If Q3 is in the on or saturated mode the collector to emitter voltage of Q3 is approximately equal to 0.2 to 0.3 volts (i.e. $V_{ce}$ of Q3=0.2–0.3 volts) which is below the base to emitter voltage of Q2 (i.e. $V_{be}$ of Q2). This causes Q2 to turn off and all current which flows through R5 is sinked by Q3. The silicon controlled rectifier (SCR) Q6 in effect connects the input to the output across R4 when Q3 is forward biased thus turning Q2 off. All of the voltage is dropped across R1, R2, R4 and SCR Q6.

Referring now to FIG. 5, a partial schematic of the power supply schematic illustrated in FIG. 2 is illustrated. The partial schematic is provided to aid in the understanding of the operation of transistors Q5 and SCR Q6. Transistor Q5 and SCR Q6 shown in FIG. 5 operate in the same fashion as transistor Q5 and SCR Q6 shown in FIG. 2.

Transistor Q5 and SCR Q6; resistors R7, R15, R17, and R6; and capacitors C2 and C6; make up the circuit which provides the necessary control of the operating conditions of transistor Q1.

Q1 has an SOA (Safe Operating Area) associated with its design and process. This SOA is defined by the manufacturer of the transistor. The SOA is a function of voltage, current and time (i.e. the maximum power dissipation of the transistor under pulse conditions or steady state DC conditions.

The voltage divider formed by resistors R7 and R15 set the Q1 voltage trip level ($V_{in}-V_{out}=\Delta V$). During power up of the power supply, $V_{in}$ will go to its normal operating level of approximately 250 volts. When the signal PWR Good is true then voltage regulator U1, Q1, Q3, and Q2 act as a constant current source. The value of the constant current source is set by R1. In the preferred embodiment the constant current source is set at approximately 200 milliamps.

This constant current source produces a time constant which consists of the equivalent regulator impedance and the valve of $C_{out}$ along with the value of $R_{load}$. In this case SCR Q6 is not enabled until normal conditions are reached. Normal operating conditions are determined at the time $\Delta V$ decreases at a value less than the instantaneous voltage decreases.

Q5 and its associated components C6, R17, and R6 control the period that SCR Q6 is disabled after the signal "PWR Good" is true. When the signal "PWR Good" is received (i.e. $V_{C6}=0$ volts), Q5 is turned off thereby disabling SCR Q6 since the R6/C6 time constant is set for the worst case condition of Vout rise time. The voltage across C6 rises until the base to emitter junction of Q5 is forward biased thus turning on Q5. Q5 is then operated in the saturated mode thereby enabling SCR Q6.

During fault conditions if the output voltage does not rise normally (i.e. shorted output) then the charging voltage across R6/C6 changes very little thus enabling Q5 faster than for a normal condition (i.e. no shorted output). Permitting Q5 to operate faster in the manner described above protects Q1 for any abnormal conditions.

Capacitor C2 is present to prevent transients or noise from triggering SCR Q6. R17 is selected to provide a discharge path for C6 and to set the maximum bias of the base/emitter and further to provide a path for the base/collector leakage current of Q5.

Regulator $U_2$ is an adjustable voltage regulator whose output is set at 5 volts. This voltage output is set by the ratio of R10 and R11. The voltage referred to as "200V Return" is not controlled by power good.

The above detailed description describes the preferred embodiment for implementing the present invention. Other improvement and modifications will become apparent to those skilled in the art having the benefit of this disclosure.

What is claimed is:

1. A regulated gas-plasma high-voltage power supply employing a fly-back topology for the first stage and an improved second stage the improvement comprising a linear post-regulated power supply comprising:

(a) a power transformer having an output connected to the input of the plasma display power supply;

(b) an overshoot protection circuit connected across the output of the transformer to prevent transmission of voltage spikes to the plasma display power supply;

(c) a current limiting circuit for limiting the electrical current transmitted through the plasma display power supply;

(d) a power transistor for receiving an input from the transformer and generating a plasma display power supply output;

(e) a high-voltage regulator for regulating the voltage indepenedent of the load impedance of the plasma display power supply output;

(f) overload protection for selectively disabling the plasma display power supply output; and (g) a sequencing circuit for selectively activating the power transistor when a signal is received by the sequencing circuit wherein the sequencing circuit coordinates activation and deactivation of the display voltage with other operational voltages within the computer.

2. A regulated gas-plasma high-voltage power supply employing a fly-back topology for the first stage and an improved second stage the improvement comprising a linear post-regulated power supply comprising:

(a) a transformer for providing an electrical input for the power supply;

(b) a power switch for receiving the electrical input and transmitting it to power supply output;

(c) a high voltage regulator for controlling the electrical potential of the power supply output independent of the load impedence;

(d) a triggering circuit responsive to receipt of a first electrical signal and operating to close the power switch upon receipt of said signal;

(e) an overload protection circuit adapted to detect an electrical potential difference of a preselected magnitude between the power supply input and the power supply output and responsive to that potential difference to open the power switch; and (f) a sequencing circuit for selectively activating the power transistor when a signal is received by the sequencing circuit wherein the sequencing circuit coordinates activation and deactivation of the display voltage with other operational voltages within the computer.

3. The power supply of claim 2, wherein the power switch comprises a transistor, and the triggering circuit is responsive to the first electrical signal to apply an activating signal to the base of the transistor, causing it to conduct.

4. The power of claim 3, wherein the overload protectin circuit includes a silicon controlled rectifier to disable the triggering circuit by removing the activating signal from the base transistor.

* * * * *